TORSIONAL DELAY LINE HAVING MEANS TO COMPENSATE FOR ATTENUATION EFFECTS

Filed June 24, 1966

*INVENTOR.*
GEORGE F. LINDSAY
*BY*
MICHAEL F. OGLO
ROY MILLER
ATTORNEYS.

United States Patent Office 3,413,601

Patented Nov. 26, 1968

3,413,601

TORSIONAL DELAY LINE HAVING MEANS TO COMPENSATE FOR ATTENUATION EFFECTS

George F. Lindsay, Arcadia, Calif., assignor to the United States of America as represented by the Secretary of the Navy Filed June 24, 1966, Ser. No. 560,930
5 Claims. (Cl. 340—146.2)

The invention described herein may be manufactured and used by or for the Government of the United States of America for governmental purposes without the payment of any royalties thereon or therefor.

This invention relates to improvements in apparatus for compensating attenuation effects in torsional delay line devices of the type employing Inverse Wiedemann Effect signal tap stations. One use of this apparatus would be in conjunction with the system disclosed in co-pending application S.N. 499,111 filed Oct. 20, 1965, entitled, "Multiple Code Delay Line Correlator," by H. J. Whitehouse and G. F. Lindsay.

One important application of the type of delay line device having Inverse Weidemann Effect taps, is the processing of very lengthy binary sequence codes. These lengthy codes, which are used in conjunction with coherent signal detection systems have of the order of 1000 binary bits or more. The length of delay line used in these instances is at least 5 feet long, and the inherent attenuation effects of the line become an appreciable factor, resulting in non-linearity of the device's response characteristics. Non-linearity, in turn, reduces the device's bandwidth. As well known to those skilled in the field of communications engineering, wide bandwidths are very desirable for components of a coherent signal detection system.

Co-pending application S.N. 474,538, filed July 20, 1965, of Harper J. Whitehouse entitled, "Improved Torsional Delay Line and Impressed Flux Linkage Interaction Device," represents one approach for compensating the delay line attenuation effects. There, compensation is achieved by varying the permeability along the line, or tapering the line. A disadvantage of this approach is that highly sophisticated metallurgical processes are required in the fabrication of such a delay line wire.

An object of the present invention is to provide an improved delay line attenuation compensation apparatus which is of special utility in connection with torsional delay line devices using Inverse Wiedemann Effect type signal taps.

Another object is to provide attenuation compensation apparatus in accordance with the preceding objective which may be readily fabricated by common manufacturing methods.

Other objects and many of the attendant advantages of this invention will be readily appreciated as the same becomes better understood by reference to the following detailed description when considered in connection with the accompanying drawings wherein.

Figures 1, 2, 3, 4, 5:
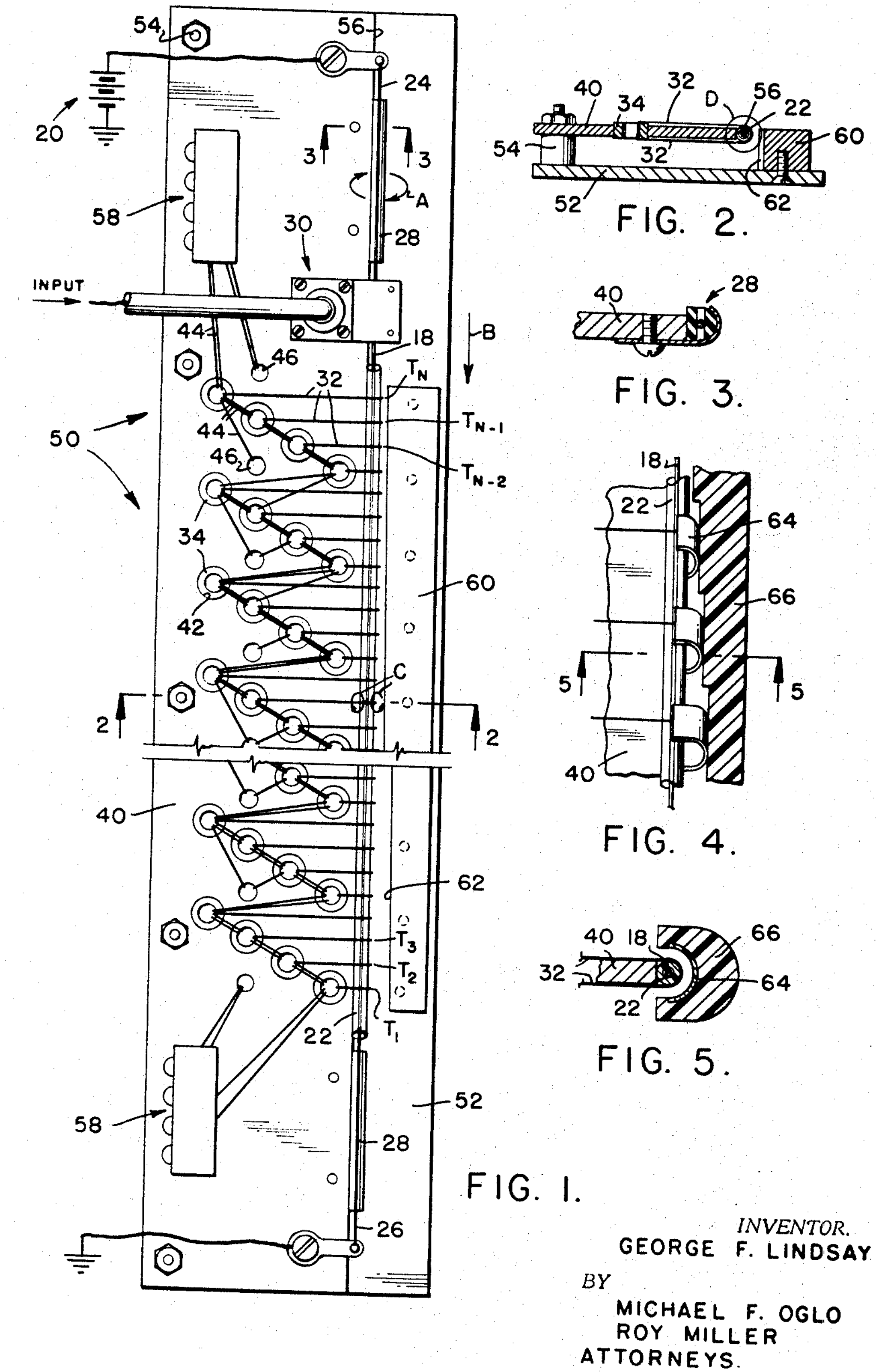
FIG. 1 is a side elevation of apparatus embodying the present invention.
FIG. 2 is a section taken at lines 2—2, FIG. 1.
FIG. 3 is a section taken at lines 3—3, FIG. 1.
FIG. 4 illustrates a modification of the invention.
FIG. 5 is a section taken along lines 5—5, FIG. 4.

Referring now to the drawing, and in particular to FIG. 1, the subject of the invention is an improved delay line device 50 for on-line detection of any one of a plurality of lengthy binary code sequences.

It is to be understood that device 50 includes a prior art portion which is essentially the same as has been disclosed in the previously cited co-pending application S.N. 499,111, the corresponding parts being assigned the same part numbers. This prior art portion comprises a torsional mode magnetostrictive delay line wire 18 having a loosely fitting insulation sleeve 22 thereabout. A voltage source 20 produces a direct current flow through wire 18, and this in turn generates a quiescent circumferential magnetic flux field thereabout, symbolically indicated on the drawing by arrow A. A continuous serial binary data input signal is applied to an input torquer 30, which converts same into a mechanical wave signal consisting of a train of acoustic torsional impulses which propagate along the line in the direction of arrow B. The binary data signal is preferably first converted into one of the conventional code forms in which the signal information is contained within a bandwidth matched to that of the torquer and delay line. One such code is the so-called "Manchester Code." A series of signal tapping stations T are disposed along the delay line. These stations are made of individual pickup loops of wire conductor 32. This form of signal tap is conventional, per se, and operates by a mode of operations sometimes called the "Inverse Wiedemann Effect," which will be described in greater detail later in this specification. Signal tapping stations T are sequentially designated $T_1$, $T_2$ . . . $T_{n-1}$, $T_n$ in the order of their disposition along delay line 18 in the direction from the terminal end 26 of wire 18 to input end 24, i.e. in the direction opposite to the direction of the propagation of the data signal. A typical embodiment of the delay line device 50 has 1024 tap stations T, and has a characteristic delay line propagation velocity ($V_c$) of 0.112 inch per microsecond. A typical input signal applied to torquer 30 has a data rate of 1 million bits per second. In such instances the pick off stations $T_1$ . . . $T_n$ are spaced 0.112 inch apart along the delay line. Conventional absorptive terminations 28, best shown in FIG. 3 taken together with FIG. 1, are used to clamp the ends of the delay line to mounting strip 40, in order to avoid acoustic reflections.

The supporting framework of device 50 comprises a strip 40 made of thin aluminum plate material, which serves as a mounting for a permanently wired transformer core matrix. As seen best in FIG. 2, mounting strip 40 is in turn attached to a base strip 52, also of thin aluminum plate stock. Strips 40 and 52 are fastened together in co-extensive spaced parallel relationship by means of threaded posts 54. Mounting strip 40 contains a plurality of circular punched holes 42 for receiving ferrite transformer cores 34. The transformer cores are cemented in place in each hole. The cores are arranged in laterally staggered diagonal patterns of four in order to minimize the longitudinal spacing between tap stations T. The insulation sleeve 22, with the delay line 18 therein, extends along and is contiguous to one edge 56 of mounting strip 40. As best shown in FIG. 2, the pickup loop 32 associated with each transformer core forms a tight loop through the center of the transformer core and around the delay line sleeve 22, and thereby serves the second function of forming the binding which holds the delay line sleeve in contiguous relation to edge 56. The framework is preferably mounted in a vertically upstanding position so that any lateral stress between the delay line wire 18 and sleeve 22 is minimized to avoid mechanical attenuation of acoustic signals.

A plurality of sense wires 44 are individually woven through the transformer cores 34. Each sense wire is threaded through each of the plurality of cores at the sequence of stations, passing through the central opening of each core in one or the other of opposite transverse directions in accordance with a predetermined binary sequence. This construction forms a voltage polarity encoding network of each sense wire. A "pass through" hole 46 is provided adjacent each set of four cores to permit passing the sense wires to the desired side of strip 40 where necessary to enable correct coding. The ends of the sense wires are accessible at multiple terminal blocks 58 at the ends of the device.

The portion of device 50 newly disclosed in connection with the improvement of the present invention will now be described. A tapered eddy current magnetic field repulsion bar 60 is mounted alongside the delay line. Bar 60 is made of copper or other non-ferritic metal conductor material. It is of rectangular cross-section and forms a planar face 62 at its side confronting the delay line. The taper is in the direction of width between face 62 and the opposite side of the bar, in order to provide increasing separation between delay line and bar in the direction of propagation. It is to be noted that edge 56 of the aluminum mounting strip 40, and face 62 of the tapered bar confront opposite circumferential zones of the circular periphery of the delay line wire. For illustrative reasons, the width of the gap between the delay line and the tapered bar 60 has been exaggerated in the drawing.

The operation of device 50 will first be briefly described, exclusive of the effects of tapered bar 60. The data signal applied to torquer 30 is converted to a continuous wave train of torsion impulses which propagate along the delay line wire 18 in the direction of arrow B. Individual Inverse Wiedemann Effect inductive interactions occur between the impulses of the train, the quiescent circumferential flux field, and the pickup loops, causing weak voltage signals to be induced into each of these loops. The transformer cores 34 in turn inductively couple these weak signals from the pickup loops into the sensing windings 44. Each core couples signals from the pickup loop to the plurality of sense wires with a sense of polarity transfer in accordance with the direction in which each individual sense wire is threaded through the center of the transformer core. Thus, the signal from the pickup loop is in some instances coupled to the sense wire without polarity inversion, and in some instances coupled with polarity inversion, depending upon the direction in which the sense wire is threaded through the transformer core. Assume then that an input data signal containing a serial binary sequence corresponding to the binary sequence code of one of the sense wires 44 is introduced into the delay line. Torquer 30 converts the signal into a train of torsional impulses having senses of motion corresponding to the code sequence. When this train of impulses passes across the sequence of tap stations having corresponding directions of sense wire threading, the weak signals coupled into the sense wire will all be of the same polarity, and an appreciable voltage signal will appear across the ends of the sense winding at terminal blocks 58. This voltage signal forms the output of device 50 indicating detection of the code sequence in the input signal. In accordance with conventional statistical detection principles, this output signal occurs even if the signal is in the presence of heavy random noise. If further details of the operation of the conventional portions of device 50 are desired, reference should be made to the previously cited co-pending application S.N. 499,111.

The inductive behavior by which a moving impulse along the torsional delay line produces a voltage signal in pickup loop 32 is sometimes referred to as the "Inverse Wiedemann Effect." One way of explaining the latter effect, using the classic conductor and magnetic field generator theory, is as follows. The torsional motion of the circumference of the delay line wire 18 in the presence of quiescent circumferential field, arrow A, generates a toroidal field. The closed flux lines of this field, represented by arrows C, FIG. 1, form an overall magnetic field configuration which is a three dimensional toroidal volume of revolution about the axis of wire 18. Arrows C represent only those lines of force lying in the plane of the drawing, and the three dimensional toroid is formed by similar lines of force in other planes through the axis of wire 18. Circular outline line D, FIG. 2, symbolically represents the outer periphery of this toroidal three dimensional configuration in a plane transverse to the axis of the toroid. This toroidal field propagates down the delay line in company with the torsional wave. The sense of polarity of the closed flux lines within the toroidal configuration depend upon the sense of motion of the torsional wave impulse. The Inverse Wiedemann Effect is due to interaction between the axially moving toroidal fields and the pickup loops 32.

The operation of device 50, as improved by presence of tapered eddy current magnetic field repulsion bar 60 will now be described, as same is presently understood. Based upon the assumption that a continuous one megacycle binary data signal of the Manchester encoded form having a data rate of one million bits per second is applied to torquer 30, approximately one to two million elemental toroidal fields of varying magnitude and sense of magnetic polarity will pass each pickoff loop 32 each second. Thus, these axially moving toroidal fields effectively appear to each tap station T as an ultra-high frequency magnetic field. In accordance with well known theory, the presence of a non-ferritic metal conductor within an ultra-high frequency magnetic field results in the generation of eddy currents in the surface layer of the metal conductor. These eddy currents in turn produce a "counter-magnetic field" which repulses the source field. The magnitude of the repulsion force bears an inverse square law relationship to the distance to the surface of the metal conductor. Attention is now directed to the effects of this repulsion force at each signal tap station T. The repulsion force results in the concentration of a greater proportion of the closed flux lines, arrow C, close to the axis of the delay line wire 18. This in turn results in a higher proportion of magnetic flux lines of the toroidal field which do not pass through the wire conductor pickup loop 32. As magnetic flux lines which do not pass through loop 32, they do not contribute to the inductive coupling between delay line and pickup loop. The magnitude of inductive coupling present at a signal tap station therefore bears an inverse relationship to the magnitude of repulsive force exerted by the presence of conductor bar 60. The relationship which the magnitude of inductive coupling at a tap station bears to the distance separating the delay line and bar 60 is thus a combination of two inverse relationships, i.e. firstly magnitude of magnetic repulsion is inversely related to distance of separation, and secondly magnitude of inductive coupling is inversely related to magnetic repulsion. The result of this combination of inverse relationships is that the wider the gap separating the delay line wire 18 and bar 60, the greater the magnitude of coupling. Accordingly, increasing the width of separation between the delay line and bar 60 in the direction of signal propagation along the delay line causes the magnetic coupling at the various tap stations to increase in the direction of delay line signal propagation. The taper of face 62 of the bar is so chosen that the resulting coupling gradient will substantially compensate the delay line attenuation effects along the line, so that a given torsional impulse will cause induction of substantially equal voltage impulses in the pickup loop 32 at all the tap stations aong the line. It will be apparent that producing more uniform responses at the signal tap stations improves the linearity of device, and increases its effective bandwidth. This in turn enables handling of longer code sequences with the advantage of more favorable communication system sensitivity threshold, or a higher degree of selectivity where the latter is desired.

It is to be noted that mounting strip 40 is also made of a non-ferritic conductive metal material (aluminum) and since the edge 56 thereof is in contact with sleeve 22 strip 40 also produces a magnetic field repulsive effect. However, in this case the effect is constant along the length of the delay line and therefore does not enter into consideration of the concept of the present invention. Also it has been discovered that presence of edge 56 in abutting contact with sleeve 22 has a favorable effect upon the overall magnitude of magnetic coupling at all signal tap stations. While not fully understood it is believed that edge 56 causes the high frequency field to be repulsed laterally outwardly from the zone of abutting contact, causing a high proportion of its flux lines to pass through the pickup loop wires 32.

FIGS. 4 and 5 illustrate a modification of the invention in which the eddy current magnetic repulsion effects are produced by a series of discrete arcuate strips 64 made of non-ferritic conductor. The strips are semi-circular in cross section and of varying diameter to produce the desired variation in inductive coupling among the signal tap stations. A plastic support member 66 is adapted to hold the arcuate strips 64 with their centers aligned about the delay line axis, and with the interior surface of each strip confronting the individual tap stations. It will be readily appreciated that this modification permits synthesizing the impulse response characteristics of device 50 in other than monotonic fashions, as may be desired to shape the output signal, or for other reasons. The spacings between delay line and elements 64 are exaggerated in the drawing.

In instances in which it is desirable to use device 50 to generate coded signals as well as to detect their presence, the device may be adapted for this purpose by provision of a torquer at end 26, in the same manner as disclosed in the previously cited co-pending applications S.N. 474,538 and 499,111.

Obviously many modifications and variations of the present invention are possible in the light of the above teachings. It is therefore to be understood that within the scope of the appended claims the invention may be practiced otherwise than as specifically described.

What is claimed is:

1. In a delay line coded signal processing device of the type involving interaction between a high frequency acoustic torsional impulse propagating along a delay line having an associated field of concentric magnetic lines of force thereabout along the length of the line, and a set of inductive tap stations along the line in a field of concentric magnetic lines of force along the line, said device including a torsional mode delay line of magneto-elastic material, a means for generating said field of concentric lines of force, said set of inductive tap stations comprising a plurality of loops of wire conductor individually wound about the delay line in longitudinally spaced relationship therealong coupled to a polarity coding and summing network adapted to individually and selectively pass or invert the polarity sense of induced signal at each station in accordance with a predetermined binary sequence code and to then sum the individual induced signals, the improvements comprising:

(a) said loops of wire conductor having their bight portions uniformly arranged along one circumferential side of said delay line, and (b) non-ferritic metal conductor means disposed in variably spaced relationship to said side of the delay line with the width of gap monotonically increasing in the direction of wave propagation along the line, said non-ferritic metal conductor means being sufficiently close to the delay line to exert an eddy current type repulsive effect upon the dynamic magnetic field associated with the torsional impulse.

2. Apparatus in accordance with claim 1, wherein:

(c) said non-ferritic metal conductor means comprises a tapered bar.

3. Apparatus in accordance with claim 2, and (d) said delay line being supported by the edge of a plate of non-ferritic metal conductor adjacent the diametrically opposite circumferential side of the delay line.

4. Apparatus in accordance with claim 1, (e) said non-ferritic metal conductor means comprising a plurality of individual metal elements, one for each loop of wire conductor forming an inductive tap station, and (f) means for supporting the elements adjacent their corresponding loops of wire conductor with their distances to the delay line increasing in the direction of wave propagation along the line.

5. Apparatus in accordance with claim 4, (g) said metal elements being formed of sheets bent into a semicircular shape and disposed in substantial concentric alignment about the bight portions of the adjacent loop of conductor.

References Cited

UNITED STATES PATENTS

| | | | |
|---|---|---|---|
| 2,837,721 | 6/1958 | Millership | 333—30 |
| 3,290,649 | 12/1966 | Whitehouse | 333—30 |

HERMAN KARL SAALBACH, *Primary Examiner.*

P. L. GENSLER, *Assistant Examiner.*